United States Patent
Gallé et al.

(10) Patent No.: US 9,977,817 B2
(45) Date of Patent: May 22, 2018

(54) MATCHING CO-REFERRING ENTITIES FROM SERIALIZED DATA FOR SCHEMA INFERENCE

(71) Applicant: Conduent Business Services, LLC, Dallas, TX (US)

(72) Inventors: Matthias Gallé, Saint Martin d'Hères (FR); Nikolaos Lagos, Grenoble (FR)

(73) Assignee: Conduent Business Services, LLC, Dallas, TX (US)

( * ) Notice: Subject to any disclaimer, the term of this patent is extended or adjusted under 35 U.S.C. 154(b) by 832 days.

(21) Appl. No.: 14/518,361

(22) Filed: Oct. 20, 2014

(65) Prior Publication Data

US 2016/0110421 A1    Apr. 21, 2016

(51) Int. Cl.
    *G06F 17/30* (2006.01)
(52) U.S. Cl.
    CPC ............... *G06F 17/30557* (2013.01)
(58) Field of Classification Search
    CPC .................................. G06F 17/30557
    See application file for complete search history.

(56) References Cited

U.S. PATENT DOCUMENTS

| | | | |
|---|---|---|---|
| 6,792,576 B1 | 9/2004 | Chidlovskii | |
| 8,332,379 B2* | 12/2012 | Duan | H04L 67/02 707/706 |
| 8,489,639 B2* | 7/2013 | Yeh | G06N 5/02 707/791 |
| 9,021,435 B2* | 4/2015 | Pletter | G06F 17/30575 709/219 |
| 9,460,198 B1* | 10/2016 | Aman | G06F 17/30707 |
| 2009/0222473 A1* | 9/2009 | Chowdhury | G06F 17/30961 |
| 2010/0060643 A1* | 3/2010 | Kolipaka | G06T 11/206 345/440 |
| 2011/0289479 A1* | 11/2011 | Pletter | G06F 17/30575 717/122 |
| 2013/0117326 A1* | 5/2013 | De Smet | G06F 9/4428 707/798 |

(Continued)

OTHER PUBLICATIONS

Bhattacharya, et al., "Relational Clustering for Multi-type Entity Resolution," Proc. 4th Intern'l workshop on Multi-relational mining (MRDM '05), pp. 3-12 (2005).

(Continued)

*Primary Examiner* — Robert Beausoliel, Jr.
*Assistant Examiner* — Susan F Rayyan
(74) *Attorney, Agent, or Firm* — Fay Sharpe LLP

(57) ABSTRACT

A system and method provide for identifying coreference from serialized data coming from different services. The method includes generating a tree structure from serialized data. The serialized data includes responses to queries from the different services. The responses each identify a hierarchical relationship between a respective set of objects. Nodes of the tree structure each have a name corresponding to a respective one of the objects. The tree structure is traversed in a breadth first manner and, for each node in the tree structure, a respective pairwise similarity is computed with each of the other nodes of the tree structure. The computed pairwise similarity is compared with a threshold to identify co-referring nodes that refer to a same entity. The threshold is a function of a depth of the node in the tree structure.

20 Claims, 6 Drawing Sheets

(56) References Cited

U.S. PATENT DOCUMENTS

| | | | | |
|---|---|---|---|---|
| 2013/0124669 | A1* | 5/2013 | Anderson | G06F 11/3006 709/217 |
| 2013/0144893 | A1* | 6/2013 | Voigt | G06F 17/30557 707/754 |
| 2013/0282740 | A1* | 10/2013 | Zhou | G06F 17/30292 707/756 |
| 2014/0172897 | A1* | 6/2014 | Nakakura | G06F 17/30923 707/758 |
| 2015/0127806 | A1* | 5/2015 | Zizlavsky | H04L 41/0853 709/224 |
| 2016/0055184 | A1* | 2/2016 | Fokoue-Nkoutche | G06F 17/30339 707/809 |

OTHER PUBLICATIONS

Bhattacharya, et al., "Collective Entity Resolution in Relational Data," J. ACM Trans. on Knowledge Discovery from Data (TKDD), vol. 1, Issue 1, Article No. 5, pp. 1-35 (2007).

Boyer, et al., "A Fast String Searching Algorithm," Communications of the ACM, vol. 20, No. 10 pp. 762-772 (1997).

Canovas Izquierdo, Javier Luis et al., "Discovering implicit schemas in JSON data," in Florian Daniel, Peter Dolog, and Qing Li, editors, Web Engineering, vol. 7977 of Lecture Notes in Computer Science, pp. 68-83, Springer Berlin Heidelberg (2013).

Elmagarmid, Ahmed K., et al., "Duplicate record detection: A survey," IEEE Trans. on Knowledge and Data Engineering, 19(1):1-16 (2007).

Horspool, "Practical Fast Searching in Strings," Software—Practice and Experience, vol. 10, pp. 10 pp. 501-506 (1980).

Knuth, et al., "Fast Pattern Matching in Strings," Siam J. Comput., vol. 6, No. 2 pp. 323-348 (1977).

Leitão, Luis, et al., "Efficient and effective duplicate detection in hierarchical data," Trans. on Knowledge and Data Engineering, vol. 25, No. 5, pp. 1028-1041 (2013).

Leitão, Luis, et al., "Structure-based inference of xml similarity for fuzzy duplicate detection," Proc. $16^{th}$ ACM Conf. on Conference on Information and Knowledge Management, pp. 293-302, ACM (2007).

Madhavan, et al., "Corpus-based schema matching." In Data Engineering, 2005. ICDE 2005. Proceedings. 21st International Conference, pp. 57-68. IEEE, (2005).

Melnik, Sergey, et al., "Similarity Flooding: A Versatile Graph Matching Algorithm and its Application to Schema Matching," Proc. 18th Intern'l Conf. On Data Engineering (ICDE), pp. 117-128 (2002).

Ngo, Duy Hoa, et al, "YAM++—Results for OAEI 2012," Proc. 7th Intern'l Workshop on Ontology Matching, pp. 226-233 (2012).

* cited by examiner

```
      closeStop Service
 Description: Stop close to position          ╱22
 Input parameter: 47.21661, -1.556754

[
    {
        "placeCode" : "SNIC",
        "tag" : "St-Nicolas",
        "distance" : "208 m",
        "line" :
          {
              "lineNum" : "C3"
          }
    },
    {
        "placeCode" : CRQU",
        "tag" : "Place du Cirque",
        "distance" : "21 m",
        "line" : [
          {
              "lineNum" : "C2"
          },
          {
              "lineNum" : "C1"
          },
          ...
        ]
    },
    ...
]
```

*FIG. 6*

MATCHING CO-REFERRING ENTITIES FROM SERIALIZED DATA FOR SCHEMA INFERENCE

BACKGROUND

The exemplary embodiment relates to processing data and in particular to identifying co-referring entities in serialized data for structuring and enriching databases with additional information.

In recent years, many organizations have begun to make use of web-services to communicate data within their organizations, or with a wider public. In order to be transferred, this data is typically serialized, a process in which the structure of the schema underlying the data is lost. The schema may be a structured database or abstract objects used in programming languages. Examples of serialization formats used for serializing data objects include JSON (JavaScript Object Notation), XML (Extensible Markup Language), and YAML (a data serialization standard which includes JSON as well as including other features).

XML schema inference has previously been studied (see, for example, U.S. Pat. No. 6,792,576). XML allows for a richer expression than JSON, its syntax is stricter and the available options for schema designers are larger. In schema inference for XML, the identification and co-reference of entities is assumed to be straightforward, and the only difficulty is in how to learn the hierarchical relationships between them. However, JSON is becoming increasingly popular for serializing data objects, partly due to its lightweight format and human-readability. It is also very general format, but easy to formalize (permitting only two ways of creating compound objects). The usage of JSON formats encourages a looser control of the overall structure, and therefore the use of different names to refer to the same concept is commonplace.

Since the JSON format is schemaless, the schema itself is not transmitted with the data. It would be desirable to be able to infer at least part of the schema from which the data was generated. However, a user observes only a few instantiations of the data through queries and thus the variability in structure poses challenges to the design of a schema inference engine.

Part of the information that is lost when data is serialized can be retrieved by finding out which fields correspond to the same underlying concept. For instance, the id of a Person may be referred by another service of the same provider as PersonId. Similarly, PlaceOfBirth may also be called City.

Identifying co-referring data is less challenging when there is some coherence, such as when the data comes from the same source, although there are still problems to be solved. In the case of entities coming from a web-service under a JSON format (a tree-like format), the only available context-information for each node is its ancestors and descendants.

Duplicate record detection (or instance matching) and similar methods have been applied to the more generic problem of ontology matching. However, in that case, the relationships between entities are much looser, with no clear hierarchical relationships. Existing methods generally perform the matching bottom-up. However these approaches are less successful when lower level nodes are very similar if their ancestor context is not taken into account (labels and even values are often repeated).

One attempt to address the problem in the case of JSON data is described in Cánovas Izquierdo, et al., "Discovering Implicit Schemas in JSON Data," Proc. 13$^{th}$ Intern'l Conf. on Web Engineering, Web Engineering, vol. 7977 of Lecture Notes in Computer Science, pp. 68-83 (2013), hereinafter, "Cánovas." However, there are several drawbacks in the Cánovas method. For example, concept (compound objects) are treated differently from properties (atomic types). This may cause problems if one type were to be exchanged for another. For example, a property is made more complicated so that an atomic type no longer suffices. Other drawbacks include concepts being treated equally as soon as their name (key value) is the same and properties being merged as soon as their value coincides and they belong to the same class. For example, one query result may include a Person with a weight of 65, and another query result includes a Person with an age of 65. Here, where two different properties of the same class have the same value, the Cánovas method fails. Other methods proposed simply perform one-to-one mappings of a JSON file to a JSON schema, which is too limited for most cases.

There remains a need for a system and method for inferring schema and co-referring types from serialized data.

INCORPORATION BY REFERENCE

The following reference, the disclosure of which is incorporated herein in its entirety by reference, is mentioned:

U.S. Pat. No. 6,792,576, issued Sep. 14, 2004, entitled SYSTEM AND METHOD OF AUTOMATIC WRAPPER GRAMMAR GENERATION, by Chidlovskii.

BRIEF DESCRIPTION

In accordance with one aspect of the exemplary embodiment, a method for identifying coreference from serialized data includes generating a tree structure from serialized data, the serialized data comprising responses to queries from different services. The responses each identify a hierarchical relationship between a respective set of objects, each object referring to an underlying entity. Nodes of the tree structure each have a name corresponding to a respective one of the objects. The tree structure is traversed in a breadth first manner and, for each node in the tree structure, a respective pairwise similarity is computed with other nodes of the tree structure. The computed pairwise similarity is compared with a threshold to identify co-referring nodes that refer to a same entity. The threshold is a function of a depth of the node in the tree structure.

At least one of the generating of the tree structure, computing a respective similarity, and identifying co-referring nodes may be performed with a processor.

In accordance with another aspect of the exemplary embodiment, a system for identifying co-referring objects from serialized data includes a querying component which receives responses from a plurality of different services, each of the responses comprising serialized data. The responses each identify a hierarchical relationship between a respective set of objects. An inference component generates a tree structure from the serialized data, nodes of the tree structure each having a name corresponding to a respective one of the objects. A matching component traverses the tree structure in a breadth first manner and for each node in the tree structure that is not a leaf node, computes a respective pairwise similarity with other nodes of the tree structure and compares the computed similarity with a threshold to identify co-referring nodes that refer to a same entity. The threshold is a function of a depth of the node in the tree structure. An information generator outputs information based on the identified co-referring nodes. A processor implements the querying component, inference component, matching component, and information generator.

In accordance with another aspect of the exemplary embodiment, a method for inferring coreference from serialized data includes receiving responses from a plurality of different services, each of the responses comprising serialized data, the responses each identifying a hierarchical relationship between a respective set of objects. A tree structure is generated from the serialized data. Nodes of the tree structure each have a name corresponding to a respective one of the objects. The tree structure is traversed in a breadth first manner and for each node in the tree structure, a respective pairwise similarity is computed with each of other nodes of the tree structure. The computing of the pairwise similarity includes computing a first similarity based on a similarity of the two nodes being compared and computing a second similarity based on a similarity of children of the two nodes being compared. The first and second similarities are aggregated. The computed pairwise similarity is compared with a threshold to identify co-referring nodes and an inferred ontology is generated in which children of co-referring nodes are linked to each of the co-referring nodes. At least one of the generating of the tree structure, computing a respective pairwise similarity, and identifying co-referring objects and generating an inferred ontology may be performed with a processor.

BRIEF DESCRIPTION OF THE DRAWINGS

FIG. 6 illustrates a response to a query to a close stop service.

DETAILED DESCRIPTION

Figure 1:
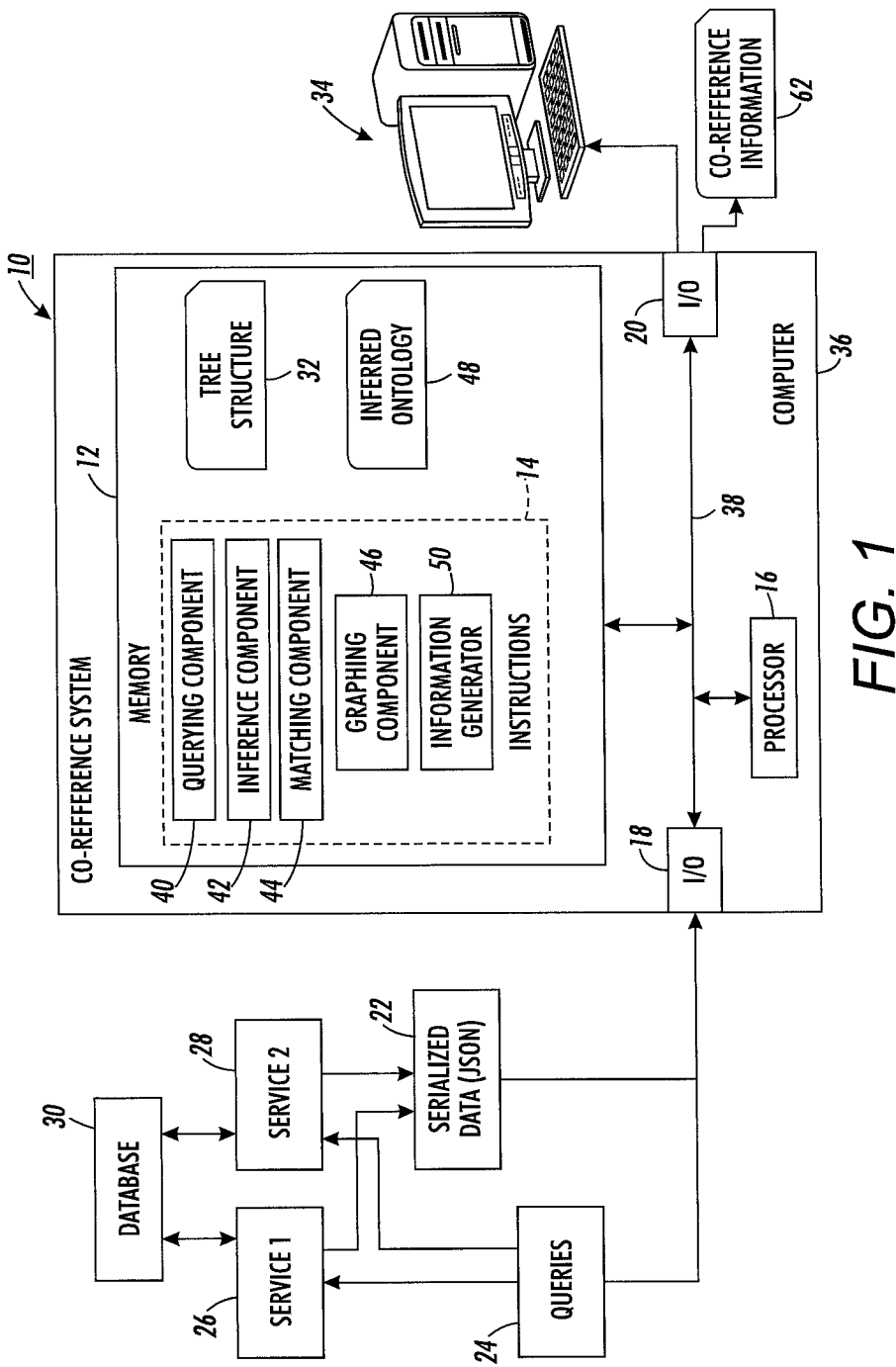
FIG. 1 is a functional block diagram of a system for schema inference in accordance with one aspect of the exemplary embodiment.

The exemplary embodiment provides a system and method for inferring the schema from which data was generated and in particular, for co-referring entities in a JSON hierarchy, created by calling different services from the same provider. Because the data transmitted is serialized, the structure that is observable is a tree in which some nodes may refer to the same underlying object (or concept). The goal is then to infer a Directed Acyclic Graph out of the tree. This is cast as a merging problem, where the decision to be taken is whether a subset of the nodes refer to the same object and thus should be merged. Such a co-reference (or de-duplication) problem is special in that the only available context for co-reference, other than similarity of node names, is the hierarchical position in the tree.

In the exemplary embodiment, a top-down traversal of the tree is performed, and content is combined with context information, thresholded by a function decreasing in the depth of the analyzed node. The approach is found to be robust when tested on two example use cases. It is assumed that the underlying model (the data schema) is hidden from the system, which is only able to observe some instantiations of it through queries. The task is then to infer the hidden model out of this sample sufficiently for co-referring entities to be identifiable.

In one embodiment, for example, where the global grammatical structure of the schema is of less interest than local relationships, the data may be transformed into a knowledge graph and global properties can then be deduced by tools operating on this graph.

JSON

A brief description of the JSON serialization format follows.

The basic types of object used in JSON are:
1) String—a sequence of zero or more Unicode characters, delimited by double quotes;
2) Number—a signed decimal number that may contain a fractional part and may use exponential notation, with no distinction between integer and floating-point values;
3) Boolean: true or false values;
4) Dictionary—an unordered associative array of key/value pairs, delimited by curly brackets, each pair being separated by commas, with the name being separated from its corresponding value by a colon;
5) Array (list): an ordered list of zero or more values of any type, separated by commas and delimited by square brackets; and
6) Null—an empty value.

The grammar of the JSON language can be represented as follows:

Object→"String"|Number|Boolean|{Dictionary}|[List]
Number→$\mathcal{Z}$ | $\mathcal{R}$
String→$\Sigma$*
Boolean→true|false
Dictionary→"String": Object, Dictionary|∈
List→Object, List|∈ where the terminals are highlighted in bold, and ∈ is the empty string. For simplicity both dictionary and lists can finish with a trailing comma. Besides the atomic types (simple objects), therefore, the only compound types of object that JSON defines are the ordered arrays (lists) and the unordered key-value pairs (dictionaries).

While JSON is used as an illustrative example, other types of serialization formats which generate serialized data in the form of a tree (each node has exactly 0 or 1 parents) are also contemplated.

Exemplary System and Method

With reference to FIG. 1, a functional block diagram of a computer-implemented system 10 for co-reference inference is shown. The computer system is configured for inferring nodes that refer to the same object in an ontology created from serialized data, e.g., in the JSON language or other language which permits different names to refer to the same underlying object. The illustrated computer system 10 includes memory 12, which stores instructions 14 for performing the exemplary method outlined in FIG. 2, and a processor 16, in communication with the memory, for executing the instructions. The processor 16 may also control the overall operation of the computer system 10 by execution of processing instructions which are stored in memory 12. One or more input/output interfaces 18, 20 allow the computer system to communicate with external devices. For example, interface 18 is a network interface which allows the system 10 to access serialized data 22 by posing queries 24 via a set of services 26, 28. The illustrated services are shown as remote services wired or wirelessly connected by the system, although the services could be hosted in system memory. The services 26, 28 access data stored in an associated database or databases 30. Responses 22 to the queries obtained by the services are sent to the system in the form of serialized data and used to generate a graph 32 in the form of a tree structure. The interface 20 may receive queries input by a user of an associated user interface 34, here illustrated as a client computing device.

The computer system 10 may include one or more computing devices, such as the illustrated server computer 36. Hardware components of the computer system may communicate via a data/control bus 38.

The instructions 14 include a querying component 40 for querying the different services 26, 28, which retrieve and serialized data as responses 22 from the database(s) 30. The data from the different services 26, 28 can use different names for objects that refer to the same underlying entity or give objects the same name while referring to different underlying entities. Each of the responses corresponds to a sub-tree with a hierarchical structure.

An inference component 42 generates the tree structure 32, based on the serialized data received in response to the queries.

A matching component 44 computes a pairwise similarity between each pair of first and second nodes of the tree 32 to identify co-referring nodes, in a top-down approach. In the exemplary embodiment similarity is computed as a function of a string similarity, which is computed between the compared nodes (optionally considering their parent nodes also), and a set similarity, which is computed between the children of the compared nodes. A threshold on the similarity is an decreasing function of a depth of the node in the tree 32.

A graphing component 46 generates an inferred ontology 48, such as a Directed Acyclic Graph (DAG), which identifies co-referring nodes. A DAG is formed by a collection of nodes and directed edges, each edge connecting one node to another, such that there is no way to start at some node n and follow a sequence of edges that eventually loops back to n again.

An information generator 50 outputs information 52, based on the generated inferred ontology 48.

The computer 36 may be a PC, such as a desktop computer, a laptop, a palmtop computer, a portable digital assistant (PDA), a server computer, a cellular telephone, a tablet computer, a pager, a combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. The network interface 18,20 allows the computer to communicate with other devices via a computer network, such as a local area network (LAN) or wide area network (WAN), or the internet, and may comprise a modulator/demodulator (MODEM) a router, a cable, and and/or Ethernet port. Memory 12 stores instructions for performing the exemplary method as well as the processed data 32, 48.

The digital processor 16 can be variously embodied, such as by a single-core processor, a dual-core processor (or more generally by a multiple-core processor), a digital processor and cooperating math coprocessor, a digital controller, or the like. The digital processor 16, in addition to controlling the operation of the computer 36, executes instructions stored in memory 12 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
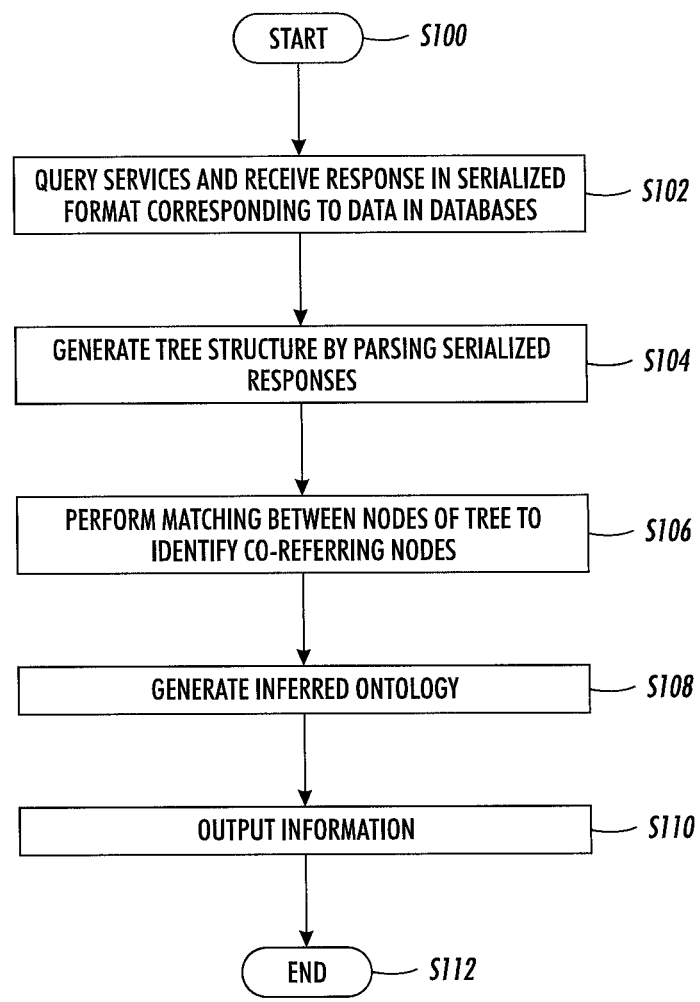
FIG. 2 is flow chart illustrating a method for schema inference in accordance with another aspect of the exemplary embodiment.

FIG. 2 illustrates a method for identifying co-referring types. The method begins at S100.

At S102, the different services 26, 28 are queried, and responses 22 in serialized form (e.g. JSON files) are received from the services based on the content of database 30, and stored. For example, the services may be queried "give me all entities of type x" (such as all devices or all applications).

At S104, a tree structure 32 is generated, by parsing the serialized data received in response to the queries.

At S106, a matching process is performed to identify co-referring nodes (nodes that refer to the same underlying entity) of the tree structure 32. The matching process includes computing a pairwise similarity between first and second nodes and comparing the pairwise similarity to a threshold which is a decreasing function of a depth of the first node in the tree 32. The pairwise similarity is computed for each pair of nodes (except for the root node and the leaf nodes, which correspond to the atomic values).

At S108, an inferred ontology 48 is generated, which identifies co-referring nodes. The inferred ontology can be considered to be a schema or partial schema of the data in the databases.

At S110, information 52 is output, based on the inferred ontology 48.

The method ends at S112.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for co-reference resolution. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Figure 3:
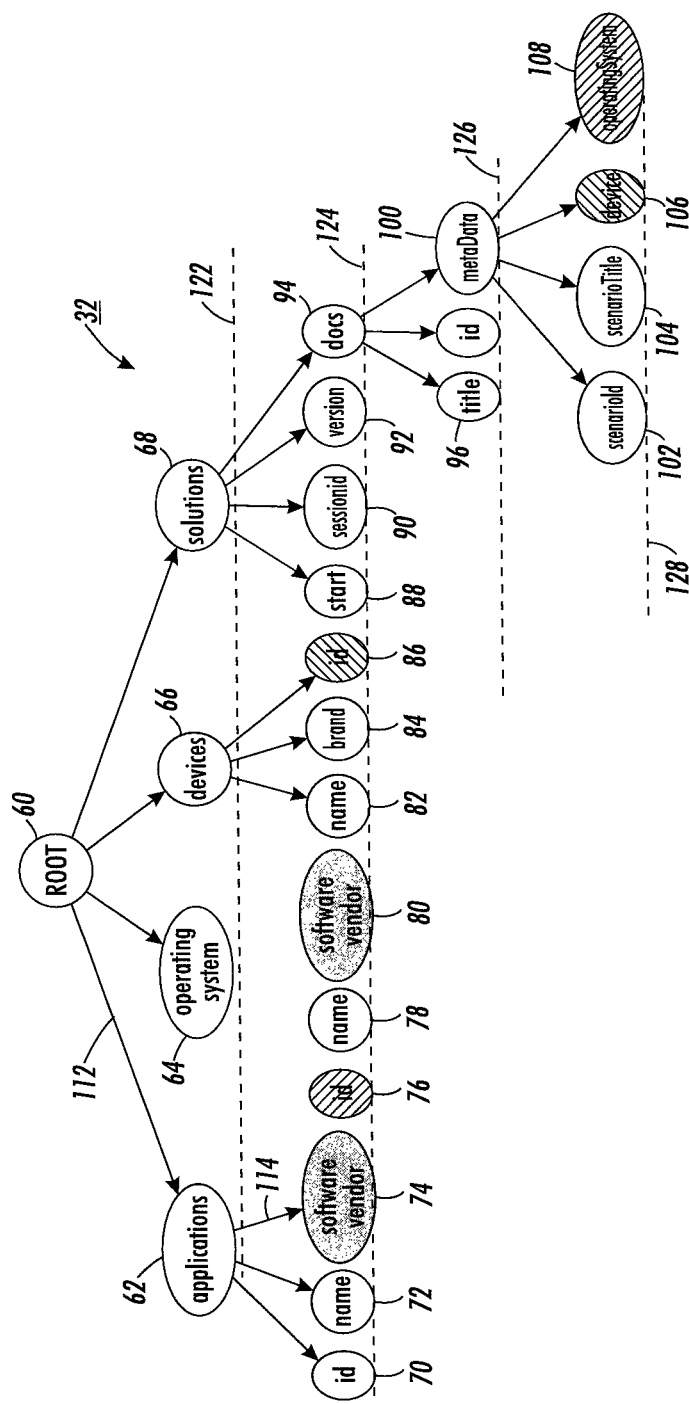
FIG. 3 shows an example customer-care tree structure created from different web-services.

An example of a tree structure 32 is shown in FIG. 3 which is generated from the answers from four different services of a mobile device customer care service organization asking (from left to right) for the (mobile device) applications in its database, the different operating system they work with, the devices, and finally the troubleshooting documents created. Each node has, as its name, the name of an object in the serialized data. For ease of illustration, the graph has been simplified, and the terminal leaf nodes (generally corresponding to a set of values for their parent node) are omitted. Those nodes that are referring to the same underlying concept and which should be merged are highlighted. It can be seen that there are some nodes which denote different classes despite having similar names: the three nodes labeled as "name" or those labeled "id." Also, there is a "title" node which is different to the "scenarioTitle" as are "applications" and "operatingSystem," despite having children with exactly the same names.

The tree structure has a root node 60 and a set of nodes 62-108, etc., each node having a name of an object that is extracted from the serialized data, and where some of these names may refer to a same underlying entity. The nodes 62-108 are connected directly or indirectly to the root node by edges 112, 114, etc. The nodes are arranged at different levels 122, 124, 126, 128, reflecting the number of edges connecting them to the root. Each node has exactly 0 (in the case of the root) or 1 parent nodes. Nodes with no descendants (not shown on FIG. 3) are referred to as leaf nodes. The maximum depth of the tree structure is the maximum number of its levels (i.e., the greatest number of edges in a path). The root 60 is assigned level 0. Nodes 102, 104 are on the fourth level.

For example, in FIG. 3, the solutions node 68 corresponds to a JSON dictionary object which has four keys. The docs key node 94 itself corresponds to a JSON dictionary object, having three keys, one of which, the metaData node 100, which corresponds to a JSON dictionary object with four keys. The solutions node 68 together with each of its descendants corresponds to a sub-tree generated from the response(s) to the query (or queries) submitted to one of the services 26, 28.

To create the tree structure, the individual sub-trees corresponding to the four JSON files returned as responses are formed into a single tree by connecting their highest level nodes 62, 64, 66, 68 to a common root node 60.

The merging problem is thus modeled as a graph 32, where each non-leaf node is either a class node or a pre-terminal node. Class nodes, such as nodes 62 and 100, can have any non-leaf node as descendants, while pre-terminal nodes, such as nodes 70 and 108 can only have leaves as descendants. At the beginning, each pre-terminal node has only one leaf node (not shown on the graph), namely the value of this attribute. These pre-terminal nodes can be interpreted as properties of the classes. However, they may be exchanged easily by rendering them more complicated.

As can be noted, such an approach does not model lists. This is based on the assumption that the values of the lists correspond to instances of the same concept. This is a reasonable assumption, since in observed cases, lists are used like this. If different concepts are returned as answers to the same query, then a dictionary can be used. Therefore, at parsing time, all elements of a list are merged into one node which has as its name the key-value of its parent key and as children, the union of all children of the elements, recursing on those children that have exactly the same name. If a type error occurs (for example, merging a Boolean value with an Integer or String one, or merging a pre-terminal with a class node) then an error is raised.

In the matching process (S106), the tree 32 is traversed in a top-down approach, with a breadth-first search. For each node n (which may be referred to as the first node or considered node), n is compared to each of the other nodes n' (which in the pairwise similarity comparison, may be referred to as the second node) in turn, detecting those similar enough to merge. For example, starting with the highest level 122 in FIG. 3, each node 62, 64, 66, 68, in turn, is compared with each of the other nodes in the tree, starting with those at the same level. The rationale behind the top-down approach is that it should be less ambiguous to merge the higher level concepts than lower level ones. Also, the fact that two parents are the same in general obliges the children to be the same, while the inverse is not true. For example, in FIG. 3, both applications 62 and operatingsystem 64 have the same key-values (id, name, software vendor).

For each node n, a set of one or more second nodes n' is then selected to merge (the set may be empty or include 1, 2, or more, but less than all other nodes). This set is selected by a pairwise similarity measure operating on nodes. When the pairwise similarity measure is above a threshold $\tau$, then it is inferred that nodes n and n' refer to the same entity and the new node n' is added to the set. The threshold may be a function decreasing in the depth of the considered node n: the higher the node n is in the tree, the more strict the merging decision may be on whether to merge n and n'. Additionally, lower-level nodes more commonly share names (id, name, value, etc.).

In one embodiment, each such set of nodes n, n' is merged automatically (raising an error as before if a type-related problem occurs, for example—merging a Boolean value with an Integer or String one, or merging a pre-terminal with a class node). In other embodiments, the merging decision may be dependent on validation of any merge by a user who may validate merges via the user interface.

The method can be implemented with an algorithm as illustrated in Algorithm 1.

---

Algorithm 1: Schema inference from serialized objects

SchemaInference(jxx)
Input: jxx, a list of JSON files
Output: An inferred ontology in the form of a DAG
1: T := empty tree
2: for all files in jxx do
3:    t := parse(j) {merges elements of lists}
4: add t to T
5: end for Algorithm 1: Schema inference from serialized objects

```
 6: for all node n in T.bfs( ) do
 7:     for all node n' ≠ n in T do
 8:         if sim(n,n') > τ(depth(n)) then
 9:             T.merge(n,n')
10:         end if
11:     end for
12: end for
13: return T
```

The method shown in Algorithm 1 starts with a set of serialized data (JSON) files 22 and an empty tree 32 (1). From each JSON file (2), the file is parsed to generate a sub-tree t, wherein elements of lists are merged (3). The sub-tree t generated by parsing the file is added to the main tree T (4). Then, the resulting tree T is traversed in a breadth first (bfs) order, and for each node in the tree T, a pairwise similarity is computed between that node and each other node. The pairwise similarity sim(n,n') is compared to a predefined threshold τ(depth(n)) which is dependent on the depth of the node n in the tree (8), starting from the root. If the computed pairwise similarity exceeds the threshold, then the nodes are inferred to refer to the same concept and can be merged (9) or proposed to a user for merging. The process is repeated for each remaining node n that has not been previously merged.

Threshold

The depth depth(n) of each node can be an integer corresponding to the number of edges between the node n and the root. Thus, all nodes at the first level 122 in FIG. 3, such as nodes 62, 64, 66, 68 have a depth of 1, nodes 72, 74, 76 a depth of 2, etc. The maximum depth of the tree is 4 in this example (ignoring, for illustration purposes only, the omitted terminal nodes).

For the threshold function τ(h), where h is the depth of a considered node, a concave decreasing function may be employed so that the threshold function τ(h) has an (exponentially) higher value the closer the node is to the root. Denoting H as the maximal depth of the tree, this may be defined as follows:

$$\tau(h) = m + \left[(M-m)\sqrt{1-\frac{h}{M}}\right]$$

(or a function thereof) which is always in the interval [m, M], where M is greater than m. For example m=0.3, M=0.85 in the example below. This means that nodes are never merged when their pairwise similarity is less than m, and are always merged when the pairwise similarity is greater than M. In this case, when comparing a node at the first level with any other node in FIG. 3, the threshold $$\tau(h) = 0.3 + 0.55\sqrt{1-\frac{1}{4}} = 0.3 + .55*0.866 = 0.7763$$

Pairwise Similarity

For computing the pairwise similarity sim function, a string similarity $sim_1$ may be combined with a set similarity $sim_2$ computed on the names of the children. The string similarity may take into account the node n' as well as its parent node. In one embodiment, as the string similarity $sim_1$, the maximal value of combining the name of n'(n'.name) with (and without) its parent's name(p.name) may be used to compute $sim_1(n,n')$:

$$sim_1(n, n') = \max_x simstr(n.name, x)$$

$$\text{for } x \in \{n'.name\} \cup$$

$$\bigcup_{(p,n') \in T} \{n'.name + p.name, p.name + n'.name\}$$

or a function thereof.

In this way, a reference to personId can match the field person.Id. For $sim_1$, as the value of sim str(n.name,x), the Levenshtein edit distance (normalized by the length of the longer string) may be used.

For the set similarity on the names of the children, the following can be used:

$$sim_2(n, n') = \frac{|n.children \cap n'.children|}{\min(|n.children|, |n'.children|)},$$

(or can be a function thereof).

i.e., the set similarity is a function of the number of children of n which overlap with the children of n' divided by the minimum of the number of children in either set. By "overlap with" it means the compared children are exactly the same as each other, or in some embodiments, meet a threshold on string similarity.

For example, nodes 64 and 66 each have three children. The number of children which overlap is two ("id" and "name"). The minimum number of children of the two nodes is 3 (in this case, both have the same number of children), so the $$sim_2(n, n') = \frac{2}{3} = 0.67.$$

The fact that children names of one node all appear under the other node may be considered as a strong signal for co-referencing. This can prove particularly useful for pre-terminal nodes, where the children are all possible values that this class takes.

In some embodiments, these two similarities may be combined multiplicatively: $sim=sim_1 \times sim_2$. In other embodiments, they may be combined linearly. In some embodiments a weighted combination may be employed, for example, by learning the parameters of the similarity functions and/or thresholds if a gold standard is available, or through semi-supervised learning. These similarity measures are intended as exemplary, and it is contemplated that other, more sophisticated similarity features could be employed, such as the position inside the graph of the different nodes, their distance to each other, or to their least common ancestors. These could prove useful, in particular, if training data is available.

Once two nodes are determined to be similar (their pairwise similarity exceeds the threshold), an additional edge or edges can be added to the graph, connecting all the children to each of the two nodes to indicate that the nodes are to be merged into one. The children of the two nodes are considered the children of the resulting merged node, i.e., as the children of both nodes n, n'. As a result, in the directed acyclic graph, a child node can have more than one parent node, such as 2, 3, or more parents. The co-referring nodes can be given the same name, such as the name of node n or a set of names corresponding to the name of node n plus the name of each of its co-referring nodes. The database can be enriched with this information.

As an example of computing pairwise similarity, consider the case of comparing node 106 with node 86. The string similarity of the name device with the name id is very low, however, taking the combination of id with the parent name gives devicesid or iddevices, thus the computed string similarity $sim_1(n,n')$ is fairly high. Added to this, assuming the child nodes are similar, or if neither node has any child nodes to be compared so $$sim_2(n, n') = \frac{0}{0},$$

i.e., $sim_2(n,n')$ is high, and also the threshold on similarity is low, since the node 106 is on the 4th level $$\left(\tau(h) = 0.3 + 0.55\sqrt{1 - \frac{4}{4}} = 0.3\right).$$

Thus, the two nodes are considered sufficiently similar at this stage to merge, even if they were not combined when node 86 was used as node n, and even though their names are very dissimilar.

The system and method may be used as a service for providing schema inference from serialized data in the web development community. The method can also be used for automatically enriching and structuring a legacy database.

Without intending to limit the scope of the exemplary embodiment, the following examples demonstrate the application of the method.

Example

Algorithm 1 with the implementations of sim and $\tau$ described above was applied to data (illustrated in simplified form in FIG. 3) from a customer-care business and data from a public transportation provider (see Cánovas for more details on the latter). For the transportation provider, two web services are available: a "close stop" service, which identifies stops close to a given position, and a "waiting time" service, which identifies the waiting time at a given stop. For example, as illustrated in FIG. 6 (from Cánovas, et al.), for the "close stop" service, the input parameter is a geographical location (latitude and longitude), and the serialized data output 22 includes, for one or more close stops, an object called "placecode" and its value (such as CRQU), an object called "tag" and its value (such as Place du Cirque), an object called "distance" and its value (such as 21 m), and a list called "line" which for each transportation line at that stop, includes an object called "linenum" and its value (such as C2).

Figure 4:
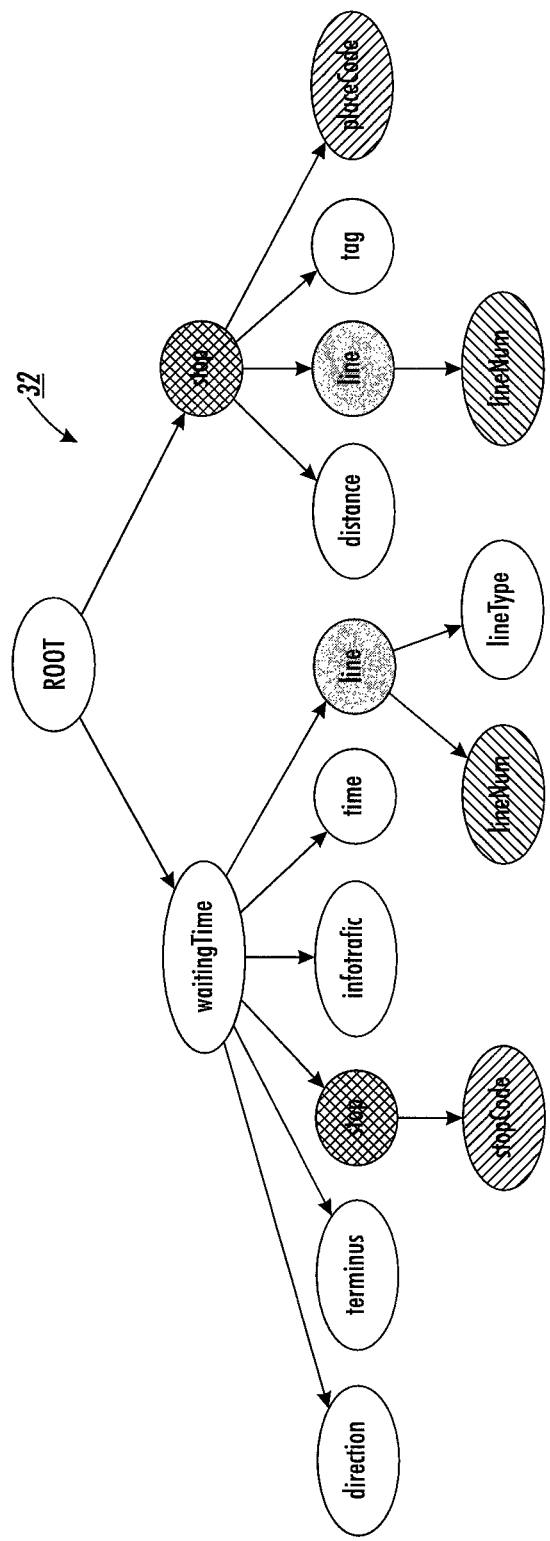
FIG. 4 illustrates a tree structure for transportation use-case.
Figure 5:
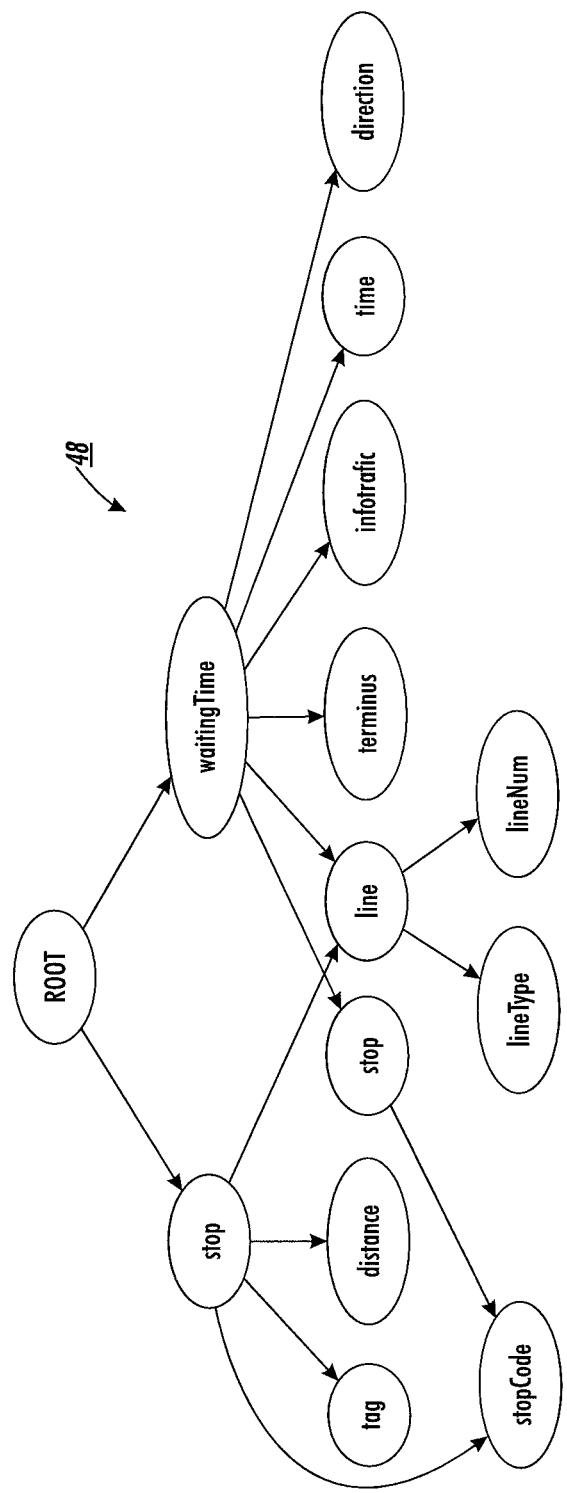
FIG. 5 illustrates an inferred schema for the transportation use-case.

The initial tree 32 and the resulting DAG 48 showing the inferred schema for the transportation use-case are shown in FIGS. 4 and 5. The customer-care dataset gets resolved perfectly while for the transportation use-case, only the co-reference of the two stop nodes is missing. This last miss is because they do not share any common children. More sophisticated similarity functions could be used to capture that case. In neither of the cases was there a false positive.

As can be seen from the DAG 48 in FIG. 5, the node stopcode now has two parents, both with the name stop, which have been inferred, based on the computed pairwise similarity, to refer to the same object.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for identifying coreference from serialized data comprising:
generating a tree structure from serialized data, the serialized data comprising responses to queries from different services, the responses each identifying a hierarchical relationship between a respective set of objects, nodes of the tree structure each having a name corresponding to a respective one of the objects;
traversing the tree structure in a breadth first manner and for each node in the tree structure, computing a respective pairwise similarity with other nodes of the tree structure;
comparing the computed pairwise similarity with a threshold to identify co-referring nodes that refer to a same entity, the threshold being a function of a depth of the node in the tree structure;
merging two nodes identified as being co-referring nodes, the merging including identifying all of the children of the two nodes as having both of the two nodes as their parents;
generating a directed acyclic graph which includes the merged nodes; and
outputting information based on the identified co-referring nodes, the information comprising the directed acyclic graph or information based thereon,
wherein at least one of the generating of the tree structure, computing a respective pairwise similarity, and identifying co-referring nodes is performed with a processor.

2. The method of claim 1, wherein the computing of the pairwise similarity comprises computing a first similarity based on a similarity of the two nodes being compared and computing a second similarity based on a similarity of children of the two nodes being compared and aggregating the first and second similarities.

3. The method of claim 2, wherein the computing of the first similarity is also based on parents of the two nodes being compared.

4. The method of claim 2, wherein the computing of the second similarity comprises identifying a number of overlapping children of the first and second nodes.

5. The method of claim 4, wherein the second similarity is a function of:

$$sim_2(n, n') = \frac{|n.children \cap n'.children|}{\min(|n.children|, |n'.children|)}$$

where n represents the first node and n' represents the second node.

6. The method of claim 2, wherein the aggregating comprises multiplying the first and second similarities.

7. The method of claim 6, wherein the threshold is a function of $$m + (M - m)\sqrt{1 - \frac{h}{H}},$$

where m and M are predefined constant values, h is a depth of the node and H is a maximum depth of the tree structure.

8. The method of claim 1, wherein the threshold is a concave decreasing function of the depth.

9. The method of claim 1, further comprising merging two nodes identified as being co-referring objects, the merging including identifying all of the children of the two nodes as having both of the two nodes as their parents.

10. The method of claim 9, comprising generating a directed acyclic graph which includes the merged nodes.

11. The method of claim 1 wherein the serialization format of the serialized data is JSON.

12. The method of claim 1, wherein the generating of the tree structure from serialized data comprises merging objects of a list into one node which has as its name the key-value of its parent key.

13. The method of claim 1, wherein the services are services of a same organization that use at least one of:
different names for the same object, and
a same name for different objects.

14. The method of claim 1, wherein the serialized data comprises responses to queries of a database, the method further comprising:
enriching a database with information on the identified co-referring nodes.

15. A method for identifying coreference from serialized data comprising:
generating a tree structure from serialized data, the serialized data comprising responses to database queries from different services, the responses each identifying a hierarchical relationship between a respective set of objects, nodes of the tree structure each having a name corresponding to a respective one of the objects;
traversing the tree structure in a breadth first manner and for each node in the tree structure, computing a respective pairwise similarity with other nodes of the tree structure, the computing of the pairwise similarity comprising:
computing a first similarity based on a similarity of the two nodes being compared, and
computing a second similarity based on a similarity of children of the two nodes being compared and aggregating the first and second similarities, wherein at least one of:
a) the computing of the first similarity is also based on parents of the two nodes being compared and comprises computing a similarity based on a maximal value of the name of the second node and a combination of the name of the second node with its parent's name, and
b) the computing of the second similarity comprises identifying a number of overlapping children of the first and second nodes, the second similarity being a function of:

$$sim_2(n, n') = \frac{|n.children \cap n'.children|}{\min(|n.children|, |n'.children|)}$$

where n represents the first node and n' represents the second node;
comparing the computed pairwise similarity with a threshold to identify co-referring nodes that refer to a same entity, the threshold being a function of a depth of the node in the tree structure; and
enriching the queried database with information on the identified co-referring nodes,
wherein at least one of the generating of the tree structure, computing a respective pairwise similarity, and identifying co-referring nodes is performed with a processor.

16. A computer program product comprising a non-transitory recording medium storing instructions, which when executed on a computer, cause the computer to perform the method of claim 1.

17. A system comprising memory which stores instructions for performing the method of claim 1 and a processor in communication with the memory which executes the instructions.

18. A system for identifying co-referring objects from serialized data comprising:
a querying component which receives responses from a plurality of different services that query a database, each of the responses comprising serialized data in the form of a respective sub-tree, the responses each identifying a hierarchical relationship between a respective set of objects;
an inference component which generates a single tree structure by connecting the serialized data sub-trees, nodes of the tree structure each having a name corresponding to a respective one of the objects;
a matching component which traverses the tree structure in a breadth first manner and for each considered node in the tree structure, computes a respective pairwise similarity with other nodes of the tree structure, starting with other nodes at a same level as the considered node, compares the computed pairwise similarity with a threshold to identify co-referring nodes that refer to a same entity, the threshold being a function of a depth of the compared node in the tree structure;
an information generator which outputs information based on the identified co-referring nodes, including enriching the database with the information on the identified co-referring nodes; and
a processor which implements the querying component, inference component, matching component, and information generator.

19. The system of claim 18, further comprising a graphing component which generates an inferred ontology based on the tree structure and the identified co-referring objects.

20. A method for inferring coreference from serialized data comprising:
receiving responses from a plurality of different services, each of the responses comprising serialized data, the responses each identifying a hierarchical relationship between a respective set of objects represented by nodes of a sub-tree;
generating a single tree structure from the serialized data by connecting the highest level nodes of the sub-trees to a common root node, each of the nodes of the tree structure having a name corresponding to a respective one of the objects;
traversing the tree structure in a top-down, breadth first manner and for each considered node in the tree structure that is not a leaf node, starting with those of the other nodes in the tree structure at a same level of the tree structure:

computing a respective pairwise similarity with each of the other nodes of the tree structure, the computing of the pairwise similarity comprising computing a first similarity based on a similarity of the two nodes being compared and computing a second similarity based on a similarity of children of the two nodes being compared and aggregating the first and second similarities, and comparing the computed pairwise similarity with a threshold to identify co-referring nodes; and generating an inferred ontology in which children of co-referring nodes are linked to each of the co-referring nodes;

wherein at least one of the generating of the tree structure, computing a respective pairwise similarity, and identifying co-referring objects and generating an inferred ontology is performed with a processor.

\* \* \* \* \*